US010214071B1

(12) United States Patent
Dillenbeck (10) Patent No.: US 10,214,071 B1
(45) Date of Patent: Feb. 26, 2019

(54) VEHICLE SUSPENSION SYSTEM WITH MULTI-STAGE HYDRAULIC CYLINDER ASSEMBLIES AND EXTERNAL SPRING PACKS

(71) Applicant: PAL Suspension LLC, Lighthouse Point, FL (US)

(72) Inventor: Michael Walter Dillenbeck, Mechanicville, NY (US)

(73) Assignee: PAL Suspension LLC, Lighthouse Point, FL (US)

(*) Notice: Subject to any disclaimer, the term of this patent is extended or adjusted under 35 U.S.C. 154(b) by 48 days.

(21) Appl. No.: 15/607,482

(22) Filed: May 27, 2017

Related U.S. Application Data (60) Provisional application No. 62/342,926, filed on May 28, 2016.

(51) Int. Cl.
*F16F 9/16* (2006.01)
*F16F 9/46* (2006.01)
(Continued)

(52) U.S. Cl.
CPC ......... B60G 17/0525 (2013.01); B60G 15/06 (2013.01); B60G 15/12 (2013.01);
(Continued)

(58) Field of Classification Search
CPC ................... B60G 17/0525; B60G 17/0565; B60G 17/08; B60G 17/0272; B60G 17/04;
(Continued)

(56) References Cited

U.S. PATENT DOCUMENTS 2,959,410 A * 11/1960 Fullam ............... F16F 9/063
267/64.25
3,128,674 A 4/1964 Ganghar et al.
(Continued)

FOREIGN PATENT DOCUMENTS

GB 596477 1/1948
GB 767932 2/1957
(Continued)

OTHER PUBLICATIONS

Rough Terrain, Improving a 2013 Ford F-150 Raptor, www.streettrucksmag.com, May 2013.
(Continued)

*Primary Examiner* — Laura Freedman
(74) *Attorney, Agent, or Firm* — Jeffrey L. Thompson; Thompson & Thompson, P.A.

(57) ABSTRACT

A vehicle suspension connects a vehicle body to a plurality of wheels and allows relative motion between the vehicle body and the wheels. The suspension system includes a plurality of telescoping multi-stage hydraulic cylinder assemblies arranged to selectively lift the vehicle body relative to the wheels when extended and to lower the vehicle body relative to the wheels when contracted. A control valve is used to adjust a volume of hydraulic fluid in the hydraulic cylinder assemblies to change a height of the vehicle. External spring packs are in fluid connection with the hydraulic cylinder assemblies to maintain spring forces on the suspension system over a range of telescopic movement of the hydraulic cylinder assemblies. Fluid damping valves are provided for damping telescopic movement of the hydraulic cylinder assemblies by restricting fluid flow between the hydraulic cylinder assemblies and the spring packs.

18 Claims, 9 Drawing Sheets

(51) Int. Cl.
*F16F 9/48* (2006.01)
*B60G 15/06* (2006.01)
*B60G 15/12* (2006.01)
*B60G 17/08* (2006.01)
*B60G 17/052* (2006.01)
*B60G 17/056* (2006.01)
*B60G 21/073* (2006.01)
*F16F 9/32* (2006.01)
*B60G 17/027* (2006.01)
*B60G 99/00* (2010.01)

(52) U.S. Cl.
CPC ......... *B60G 17/0565* (2013.01); *B60G 17/08* (2013.01); *B60G 21/073* (2013.01); *F16F 9/165* (2013.01); *F16F 9/3292* (2013.01); *F16F 9/464* (2013.01); *F16F 9/486* (2013.01); *B60G 17/0272* (2013.01); *B60G 99/008* (2013.01); *B60G 2500/30* (2013.01); *B60G 2800/914* (2013.01)

(58) Field of Classification Search
CPC .......... B60G 17/0416; B60G 2400/252; B60G 2800/914; B60G 2500/202; B60G 2500/30; B60G 2500/302; B60G 21/073; B60G 15/06; B60G 15/08; B60G 15/12; B60G 2202/15; B60G 2202/24; B60G 2202/32; B60G 2202/322; B60G 99/008; F16F 9/14; F16F 9/165; F16F 9/18; F16F 9/185; F16F 9/3257; F16F 9/3292; F16F 9/464; F16F 9/486
See application file for complete search history.

(56) References Cited

U.S. PATENT DOCUMENTS

| | | | | |
|---|---|---|---|---|
| 3,170,377 A * | 2/1965 | Herpich | ................... | B65F 3/28 414/517 |
| 3,363,894 A | 1/1968 | Hill | | |
| 3,483,798 A * | 12/1969 | Parrett | ................... | F15B 15/16 91/169 |
| 3,691,904 A | 9/1972 | Pesci | | |
| 3,973,468 A | 8/1976 | Russell, Jr. | | |
| 4,191,092 A | 3/1980 | Farmer | | |
| 4,344,354 A * | 8/1982 | Suessenbeck | ........... | F15B 15/16 91/168 |
| 4,491,207 A * | 1/1985 | Boonchanta | ........... | B60G 17/08 188/266.5 |
| 4,724,937 A | 2/1988 | Fannin et al. | | |
| 4,726,281 A * | 2/1988 | De Filippi | ............... | F15B 15/16 91/167 R |
| 4,828,231 A * | 5/1989 | Fukumura | ................ | F16F 9/088 188/314 |
| 4,838,394 A | 6/1989 | Lemme et al. | | |
| 4,936,424 A * | 6/1990 | Costa | ...................... | F16F 9/064 188/314 |
| 5,219,152 A * | 6/1993 | Derrien | .............. | B60G 17/0416 267/118 |
| 5,246,247 A * | 9/1993 | Runkel | ................... | B60G 11/26 280/124.159 |
| 5,288,102 A * | 2/1994 | Machida | ................ | B60G 15/12 267/64.16 |
| 5,295,563 A * | 3/1994 | Bennett | ............. | B60G 17/0152 188/266.2 |
| 5,351,790 A * | 10/1994 | Machida | .............. | B60G 13/003 188/266.2 |
| 5,566,970 A * | 10/1996 | Lin | ...................... | B60G 21/073 267/186 |
| 5,961,106 A | 10/1999 | Shaffer | | |
| 6,116,140 A | 9/2000 | Barthalow et al. | | |
| 6,131,709 A * | 10/2000 | Jolly | ......................... | F16F 9/20 137/909 |
| 6,213,261 B1 * | 4/2001 | Kunkel | .............. | B60G 17/0416 188/284 |
| 6,269,918 B1 | 8/2001 | Kurusu et al. | | |
| 6,356,075 B1 * | 3/2002 | Shank | ................ | B60G 17/0185 280/5.501 |
| 6,702,265 B1 | 3/2004 | Zapletal | | |
| 6,978,872 B2 * | 12/2005 | Turner | ............... | B60G 17/0424 188/282.1 |
| 7,156,214 B2 | 1/2007 | Pradel et al. | | |
| 7,766,136 B2 * | 8/2010 | Runkel | .................... | F16F 9/096 188/297 |
| 7,857,325 B2 | 12/2010 | Copsey et al. | | |
| 8,151,953 B2 | 4/2012 | Runkel | | |
| 8,240,689 B2 | 8/2012 | Holt et al. | | |
| 8,262,100 B2 * | 9/2012 | Thomas | ................ | B60G 17/021 188/321.11 |
| 8,967,346 B2 | 3/2015 | Polakowski et al. | | |
| 9,108,485 B2 | 8/2015 | Laird et al. | | |
| 9,239,090 B2 | 1/2016 | Marking | | |
| 9,784,333 B2 * | 10/2017 | Marking | ................ | B60G 13/08 |
| 2005/0199457 A1 * | 9/2005 | Beck | ................... | B60G 17/0272 188/314 |
| 2006/0124414 A1 * | 6/2006 | Hanawa | ................. | B62K 25/08 188/314 |
| 2012/0193849 A1 * | 8/2012 | Runkel | ..................... | F16F 9/06 267/217 |
| 2014/0265168 A1 | 9/2014 | Giovanardi et al. | | |
| 2014/0291085 A1 | 10/2014 | Bandy | | |
| 2016/0229253 A1 | 8/2016 | Seminara | | |
| 2018/0066724 A1 | 3/2018 | Galasso et al. | | |

FOREIGN PATENT DOCUMENTS

| | | | | |
|---|---|---|---|---|
| JP | 11291737 A | * | 10/1999 | ......... B60G 17/0416 |
| JP | 2000027919 A | * | 1/2000 | |
| JP | 2000161413 A | * | 6/2000 | |

OTHER PUBLICATIONS

J. A. Razenberg, DCT 2009.114, Modelling of the Hydro-pneumatic Suspension System of a Rally Truck, Master Thesis, Eindhoven University of Technology, Department of Mechanical Engineering, Dynamics and Control Group, Eindhoven, Sep. 2009.

Hendrickson, Military Suspension Product Line, promotional brochure, 2014.

Hendrickson, Hydro-Pneumatic Suspension System, promotional brochure, 2014.

* cited by examiner

VEHICLE SUSPENSION SYSTEM WITH MULTI-STAGE HYDRAULIC CYLINDER ASSEMBLIES AND EXTERNAL SPRING PACKS

RELATED APPLICATIONS

This application claims the benefit of U.S. Provisional Patent Application No. 62/342,926 filed on May 28, 2016. The entire content of this related application is incorporated herein by reference.

BACKGROUND OF THE INVENTION

Field of the Invention

The present invention relates to vehicle suspension systems, and in particular to a vehicle suspension system having vehicle height adjustment.

Description of the Prior Art

Height adjustment devices for vehicle suspensions are known in the prior art. For example, U.S. Patent Application Publication No. 2016/0229253 of Seminara discloses a suspension strut for a motor vehicle with a height-adjustment device. Such devices have been used with MacPherson suspensions on sport utility vehicles to position the vehicle body at a greater height from the ground when the vehicle is running off road, and at a smaller height from the ground when the vehicle is running on road. Such devices have also been used on sports cars, for example, to reduce the vehicle height to ensure better driving conditions at high speed.

In a typical vehicle suspension system, single stage shock absorbers are used that have a single piston/shaft sliding in a single cylindrical tube. Such shock absorbers have an extended length less than twice a compressed length. Single stage shock absorber are widely used for ordinary vehicle suspension systems.

Multi-stage hydraulic cylinder assemblies for vehicle suspensions have also been described in the prior art. For example, U.S. Patent Application Publication No. 2014/0291085 of Bandy discloses a segmented air shock absorber that uses an oil-gas emulsion air shock design with shock damping and suspension spring properties. For another example, U.S. Pat. No. 8,967,346 of Polakowski et al. discloses a multi-stage telescopic shock absorber that contains an internal damping chamber for damping shock forces applied to the shock absorber. For another example, U.S. Pat. No. 3,363,894 of Hill discloses a dual spring rate shock strut for use as an aircraft strut to provide a substantially constant strut extension over a range of static loads of the aircraft.

However, none of the multi-stage cylinder assemblies described above provide a system that can be used to provide vehicle height adjustment over a wide range for variable ride height while maintaining a consistent and acceptable ride quality.

There is a need in the industry for an improved vehicle suspension system that allows a wide range of vehicle height adjustments while maintaining a compact multi-stage configuration that also provides consistent spring forces and desired ride quality.

SUMMARY OF THE INVENTION

An object of the present invention is to provide a vehicle suspension system having multi-stage hydraulic cylinder assemblies that provide height adjustment in a range greater than a length of the hydraulic cylinder assemblies in their fully contracted condition.

A further object of the present invention is to provide a vehicle suspension system having multi-stage hydraulic cylinder assemblies in fluid communication with external spring packs and damping valves to provide consistent spring forces and ride quality over a wide range of vehicle height adjustments.

A further object of the present invention is to provide a vehicle suspension system having a multi-stage hydraulic cylinder assembly associated with each of the wheels of the vehicle.

A further object of the present invention is to provide a vehicle suspension system having an anti-sway system that uses a plurality of multi-stage hydraulic cylinder assemblies and fluid lines connected therebetween.

To accomplish these and other objects, the present invention provides a vehicle suspension that connects a vehicle body to a plurality of wheels and allows relative motion between the vehicle body and the wheels. The suspension system includes a plurality of telescoping multi-stage hydraulic cylinder assemblies arranged to selectively lift the vehicle body relative to the wheels when extended and to lower the vehicle body relative to the wheels when contracted. A control valve is used to adjust a volume of hydraulic fluid in the hydraulic cylinder assemblies to change a height of the vehicle. External spring packs are in fluid connection with the hydraulic cylinder assemblies to maintain spring forces on the suspension system over a range of telescopic movement of the hydraulic cylinder assemblies. Fluid damping valves are provided for damping telescopic movement of the hydraulic cylinder assemblies by restricting fluid flow between the hydraulic cylinder assemblies and the spring packs.

According to one aspect of the present invention, a vehicle suspension system is provided comprising: a telescoping multi-stage hydraulic cylinder assembly arranged to selectively lift a vehicle body relative to a vehicle wheel when extended and lower the vehicle body relative to the vehicle wheel when contracted; an external spring pack in fluid connection with the hydraulic cylinder assembly to maintain a spring force on the suspension system over a range of telescopic movement of the hydraulic cylinder assembly; and a fluid damping valve for damping telescopic movement of the hydraulic cylinder assembly by restricting fluid flow between the hydraulic cylinder assembly and the spring pack.

According to another aspect of the present invention, a vehicle is provided comprising: a vehicle body; a plurality of wheels; and a suspension system that connects the vehicle body to the plurality of wheels and allows relative motion between the vehicle body and the wheels. The suspension system comprises: a plurality of telescoping multi-stage hydraulic cylinder assemblies arranged to selectively lift the vehicle body relative to the wheels when extended and to lower the vehicle body relative to the wheels when contracted; a plurality of external spring packs in fluid connection with the plurality of hydraulic cylinder assemblies to maintain spring forces on the suspension system over a range of telescopic movement of the hydraulic cylinder assemblies; and a plurality of fluid damping valves for damping telescopic movement of the hydraulic cylinder assemblies by restricting fluid flow between the hydraulic cylinder assemblies and the spring packs.

According to another aspect of the present invention, a vehicle suspension is provided comprising: first and second telescoping multi-stage hydraulic cylinder assemblies mounted on right and left sides of a vehicle, respectively, the hydraulic cylinder assemblies being arranged to selectively lift the vehicle when extended and lower the vehicle when contracted, wherein each of the hydraulic cylinder assemblies comprises a plurality of cylinders nested within each other, wherein a length of each of the hydraulic cylinder assemblies in a fully extended condition is more than double a length thereof in a fully contracted condition, and wherein each of the hydraulic cylinder assemblies are two-way cylinder assemblies having a pressure side and a reservoir side; first and second external spring packs in fluid connection with the first and second hydraulic cylinder assemblies, respectively, to maintain spring forces on the hydraulic cylinder assemblies over a range of telescopic movement of the hydraulic cylinder assemblies; fluid damping valves for damping movement of the hydraulic cylinder assemblies by restricting fluid flow between the hydraulic cylinder assemblies and the spring packs; and an anti-sway system comprising a first anti-sway fluid line connected between a pressure side of the first hydraulic cylinder assembly and a reservoir side of the second hydraulic cylinder assembly, and a second anti-sway fluid line connected between a pressure side of the second hydraulic cylinder assembly and a reservoir side of the first hydraulic cylinder assembly.

Numerous other objects of the present invention will be apparent to those skilled in this art from the following description wherein there is shown and described embodiments of the present invention, simply by way of illustration of some of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE INVENTION

A vehicle suspension system 10 according to the present invention will now be described in detail with reference to FIGS. 1 to 13 of the accompanying drawings.

The vehicle suspension system 10 of the present invention can replace conventional shock absorbers found in a vehicle V. The vehicle suspension system 10 can also replace traditional spring components and anti-sway systems used on many vehicles.

Figure 1:
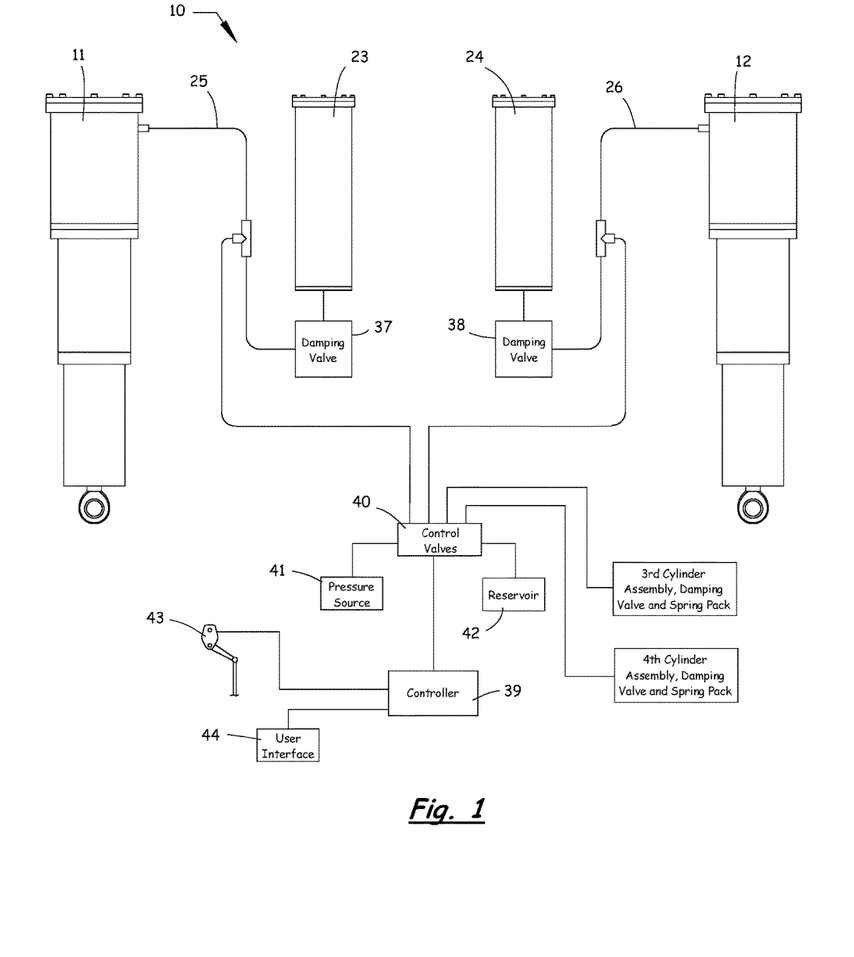
FIG. 1 is a diagram illustrating a vehicle suspension system having telescoping multi-stage hydraulic cylinder assemblies and external spring packs according to the present invention.
Figure 12:
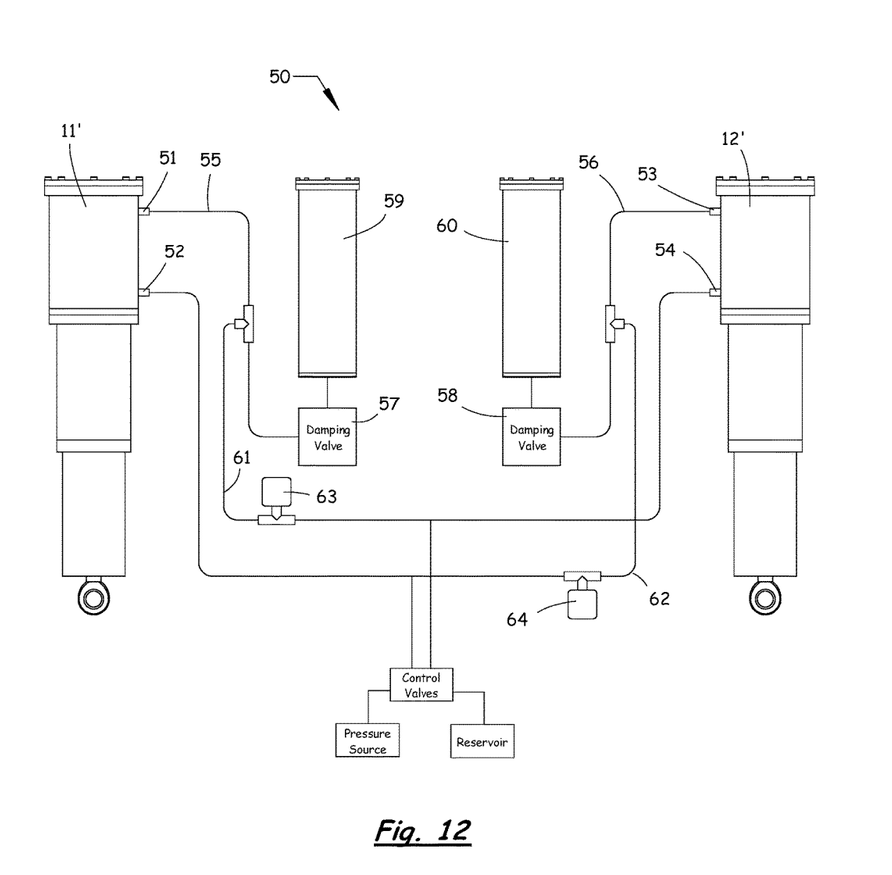
FIG. 12 is a diagram illustrating a vehicle suspension system having a sway control system according to the present invention.

As illustrated in FIG. 1, the vehicle suspension system 10 includes telescoping multi-stage hydraulic cylinder assemblies 11, 12. The hydraulic cylinder assemblies 11, 12 are shown in a fully extended position in FIG. 1. The hydraulic cylinder assemblies can be one-way hydraulic cylinder assemblies 11, 12, as shown in FIG. 1, or two-way hydraulic cylinder assemblies 11', 12', as shown in FIG. 12. The hydraulic cylinder assemblies 11, 12 are each arranged to selectively lift the vehicle body 13 relative to a vehicle wheel 14, 15 when extended, and to lower the vehicle body 13 relative to the vehicle wheel 14, 15 when contracted.

Figure 2:
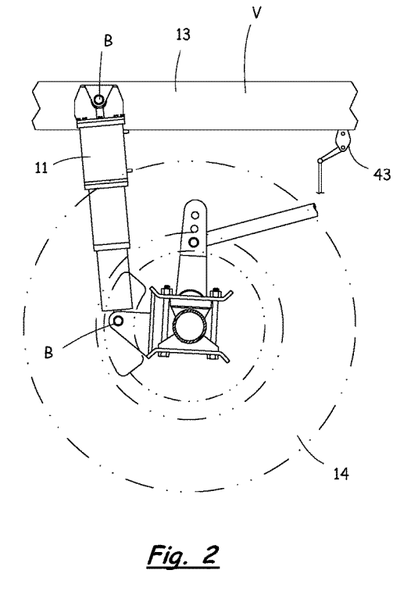
FIG. 2 is an elevation view showing a telescoping multi-stage hydraulic cylinder assembly of the present invention installed in a vehicle in place of a conventional rear shock absorber.
Figure 3:
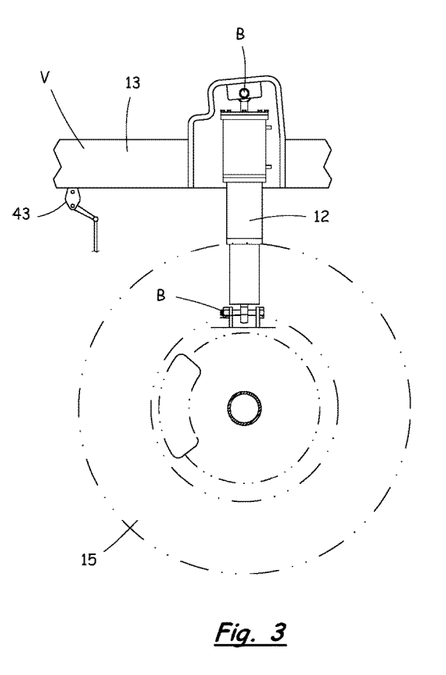
FIG. 3 is an elevation view showing a telescoping multi-stage hydraulic cylinder assembly of the present invention installed in a vehicle in place of a conventional front shock absorber.

As illustrated in FIGS. 2 and 3, the hydraulic cylinder assemblies 11, 12 can be installed on the vehicle V in place of conventional shock absorbers. For example, the hydraulic cylinder assemblies 11, 12 can be installed to existing upper and lower shock absorber mounting pins/bolts B adjacent to a rear wheel 14 of the vehicle V (FIG. 2) or a front wheel 15 of the vehicle V (FIG. 3). The conventional leaf springs (not shown) and coil springs (not shown) for the vehicle V can also be removed because their functions are provided by the hydraulic cylinder assemblies 11, 12 and other components of the vehicle suspension system 10 of the present invention.

Figure 5:
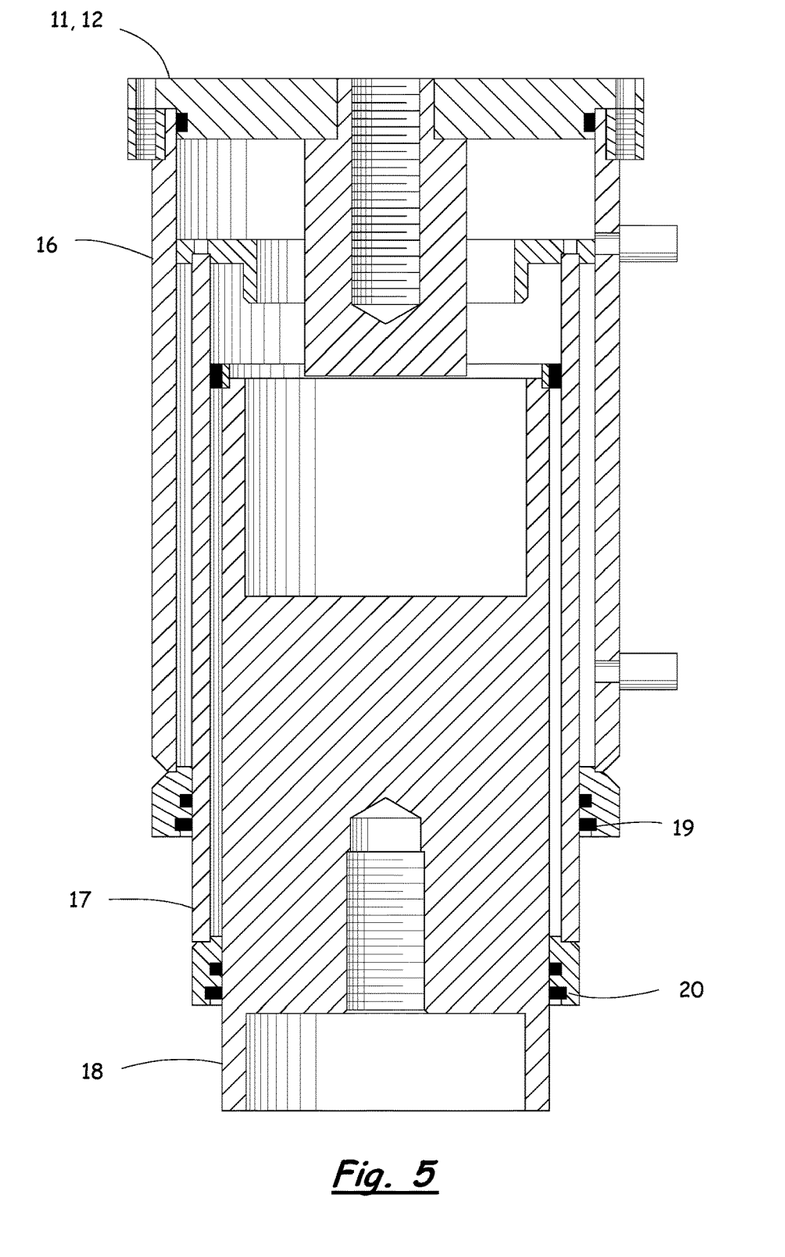
FIG. 5 is a cross section view of the telescoping multi-stage hydraulic cylinder assembly in a contracted position.
Figure 6:
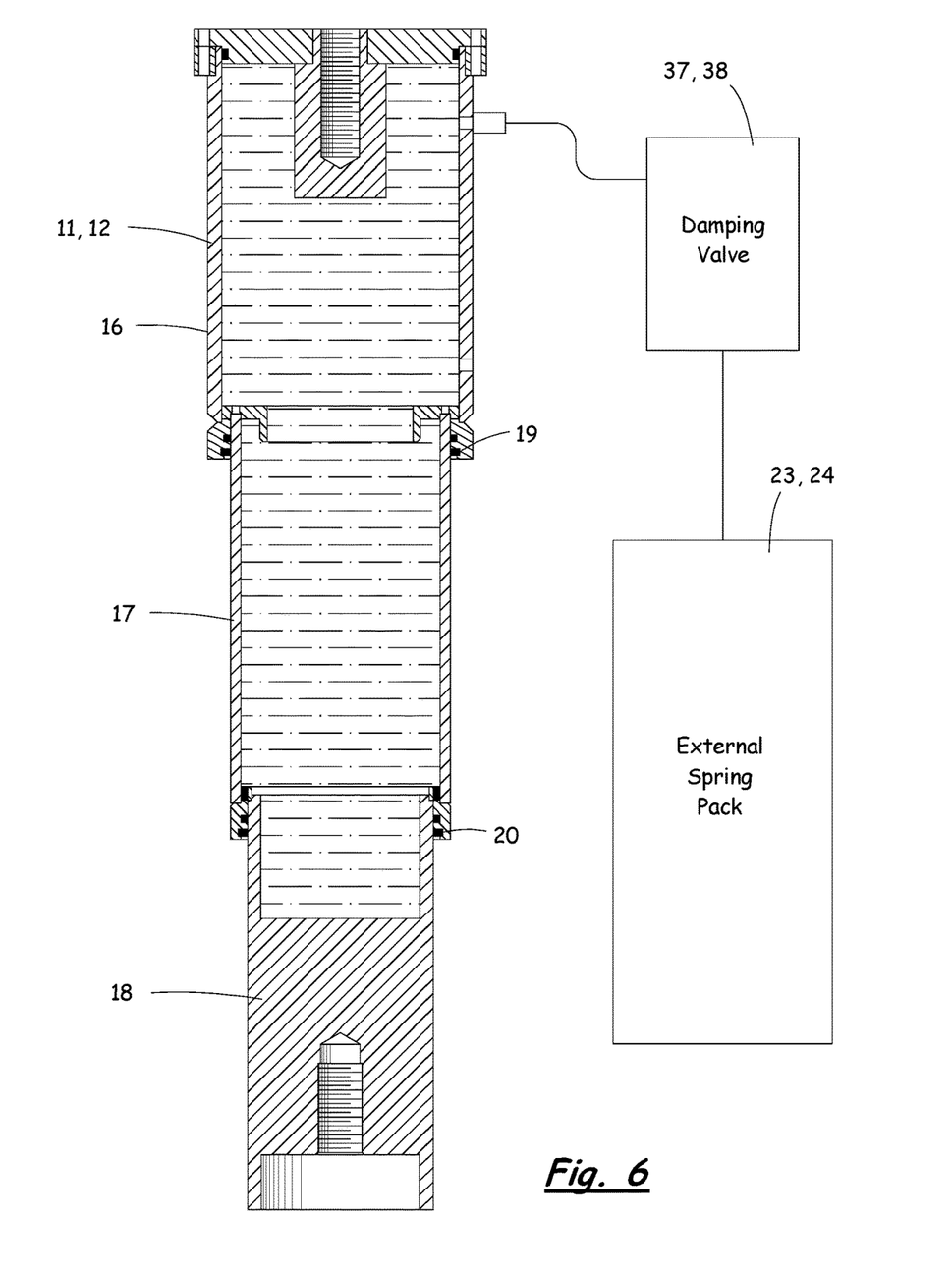
FIG. 6 is a cross section view of the telescoping multi-stage hydraulic cylinder assembly in an extended position.

The hydraulic cylinder assemblies 11, 12 illustrated in the drawings of this application are two-stage cylinder assemblies having a base cylinder 16, an intermediate cylinder 17 arranged for sliding movement within the base cylinder 16, and a shaft 18 arranged for sliding movement within the intermediate cylinder 17. As illustrated in FIG. 6, the base cylinder 16 and the intermediate cylinder 17 together define a single internal chamber. As illustrated in FIG. 5, seals 19 are provided between the base cylinder and the intermediate cylinder, and seals 20 are provided between the intermediate cylinder 17 and the shaft 18. A first coupler 21 is provided on the upper end of the base cylinder 16 for attaching to an upper shock absorber mounting bolt B. A second coupler 22 is provided on the lower end of the shaft 18 for attaching to a lower shock absorber mounting bolt B.

Figure 4:
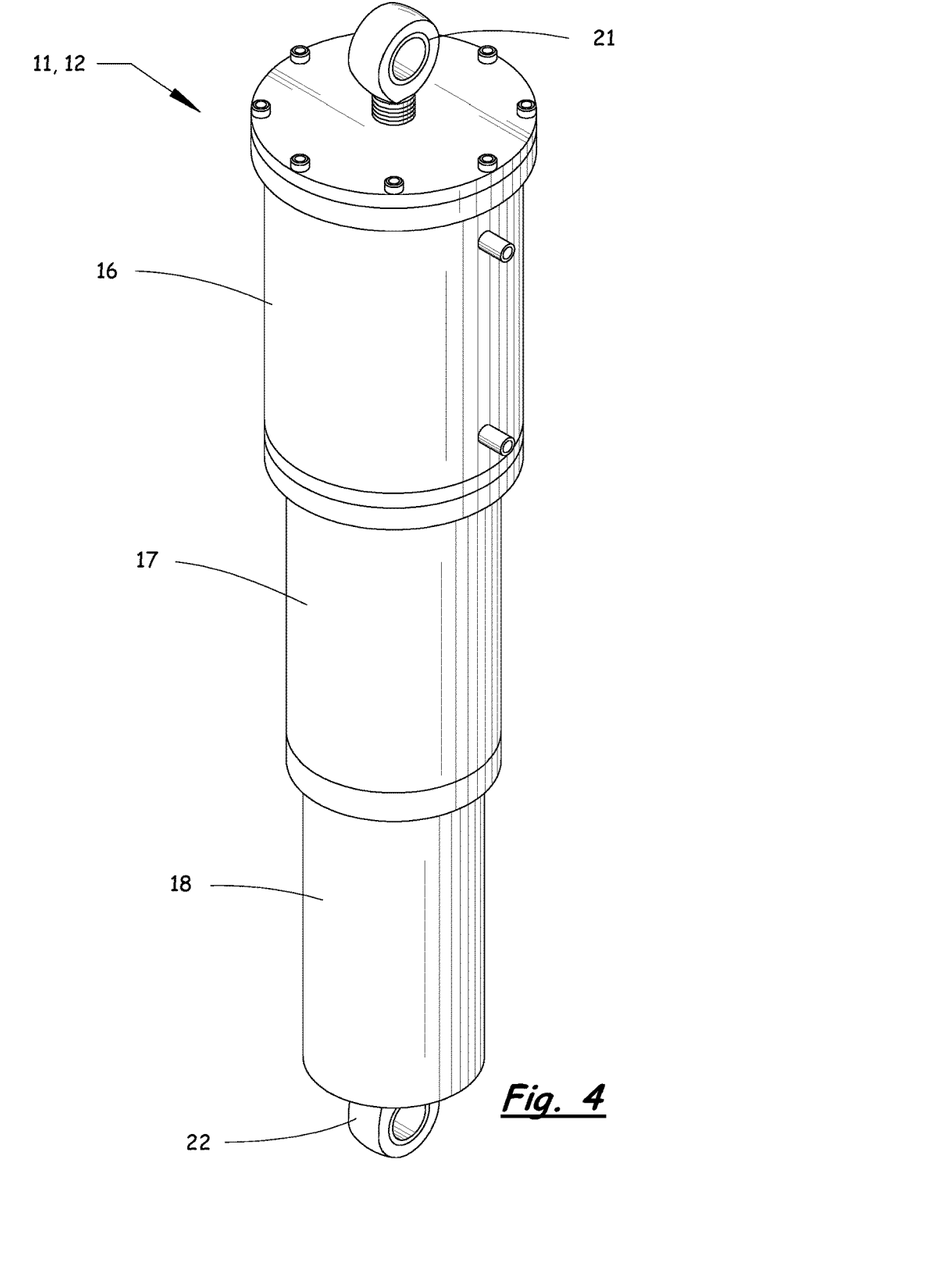
FIG. 4 is a perspective view of a telescoping multi-stage hydraulic cylinder assembly used in the vehicle suspension system of the present invention.

In a contracted condition of the hydraulic cylinder assemblies 11, 12 (as shown in FIG. 5), the intermediate cylinder 17 telescopes or nests within the base cylinder 16, and the shaft 18 telescopes or nests within the intermediate cylinder 17. In an extended condition of the hydraulic cylinder assemblies 11, 12 (as shown in FIGS. 1, 4 and 6), the intermediate cylinder 17 protrudes out of the base cylinder 16, and the shaft 18 protrudes out of the intermediate cylinder 17. A length of the hydraulic cylinder assemblies 11, 12 in a fully extended condition is more than double a length of the hydraulic cylinder assemblies 11, 12 in a fully contracted condition.

Additional stages can be added to the hydraulic cylinder assemblies 11, 12 to increase a length of the hydraulic cylinder assemblies 11, 12 when fully extended. For example, instead of a two-stage cylinder assembly having one intermediate cylinder 17, a three-stage cylinder assembly having two intermediate cylinders can be used to increase an extended length of the cylinder assembly.

By using multi-stage hydraulic cylinder assemblies 11, 12, it is possible to have a shock absorber-like member that can extend numerous times its compressed height. This allows a long extension range in a limited space envelope, which can be particularly useful in a suspension system that requires a wide range of travel. For example, a two-stage hydraulic cylinder assembly 11, 12 can extend approximately two times the compressed height, while a four-stage hydraulic cylinder assembly can extend approximately four times the compressed height. In contrast, a traditional shock absorber used in most vehicle suspensions uses a single-stage assembly having approximately a 1:1 ratio or less of an extension.

The vehicle suspension system 10 includes external spring packs 23, 24 in fluid connection with the single internal chambers of the hydraulic cylinder assemblies 11, 12. The external spring packs 23, 24 function to maintain a spring force on the suspension system over a range of telescopic movement of the hydraulic cylinder assemblies 11, 12. The spring packs 23, 24 are located remote from the hydraulic cylinder assemblies 11, 12. For example, the spring packs 23, 24 can be mounted at a central location on the vehicle V and connected to the hydraulic cylinder assemblies 11, 12 by hydraulic lines 25, 26.

Figure 7:
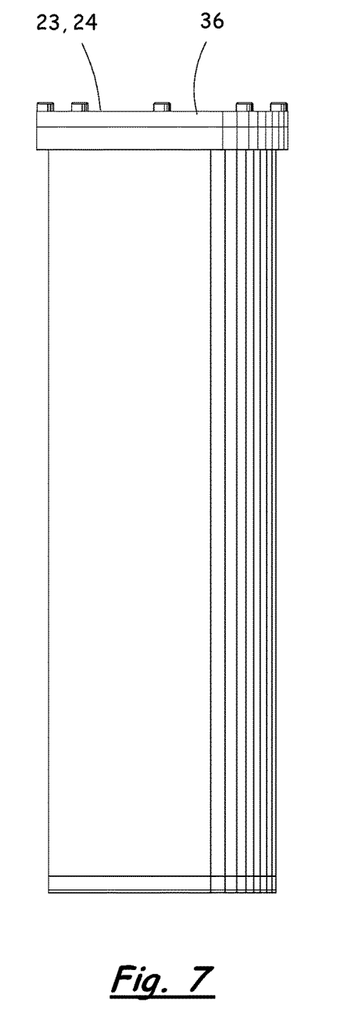
FIG. 7 is a plan view of an external spring pack used in the vehicle suspension system of the present invention.
Figure 8:
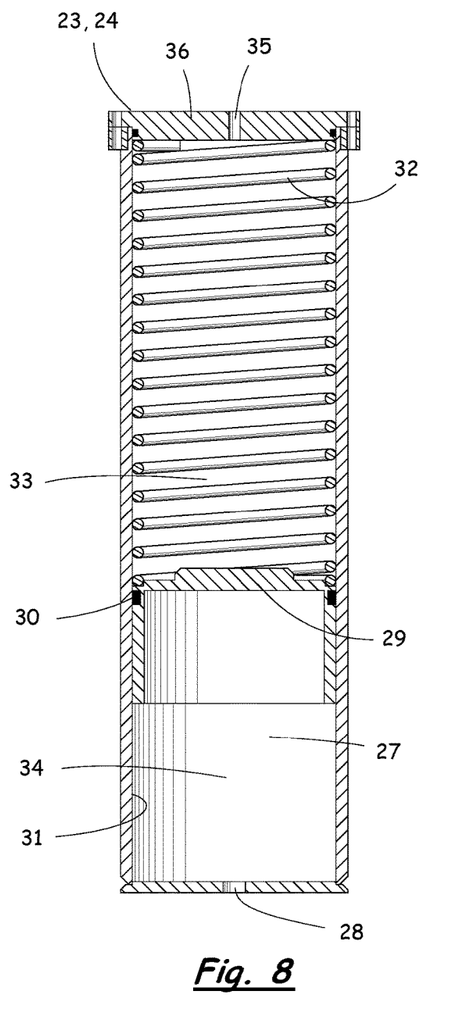
FIG. 8 is a cross section view of the external spring pack shown in FIG. 7.

The spring packs 23, 24 can have a variety of different forms. For example, as illustrated in FIGS. 7 and 8, the spring packs 23, 24 can have a cylindrical chamber 27 having a port 28 at one end for connecting a hydraulic line in fluid connection with the hydraulic cylinder assembly 11, 12. A piston plunger 29 having a seal 30 that engages an inner cylindrical surface 31 of the chamber 27 is arranged for sliding movement within the cylindrical chamber 27. A coil spring 32 is arranged on a spring side 33 of the chamber 27 to bias the piston plunger 29 in a direction that applies positive hydraulic pressure on a fluid side 34 of the chamber 27 to the hydraulic cylinder assembly 11, 12. A second port 35 in the other end of the cylindrical chamber 27 can be used to vent the spring side 33 of the chamber 27 during movement of the piston plunger within the chamber 27, or to provide a secondary source of spring force (e.g., pneumatic pressure) to the piston plunger 29. The spring packs 23, 24 can be constructed with a removable end 36 to allow for relatively easy spring removal or replacement/variation.

Figure 9:
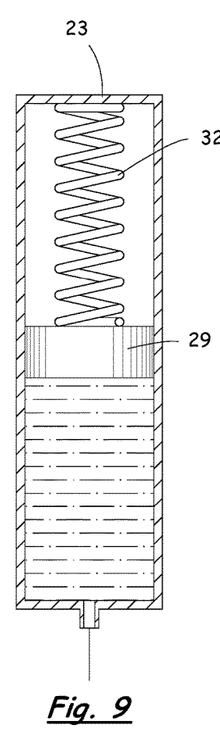
FIG. 9 is a cross section diagram of an external spring pack that uses a coil spring to apply a spring force to the hydraulic fluid in the vehicle suspension system.
Figure 10:
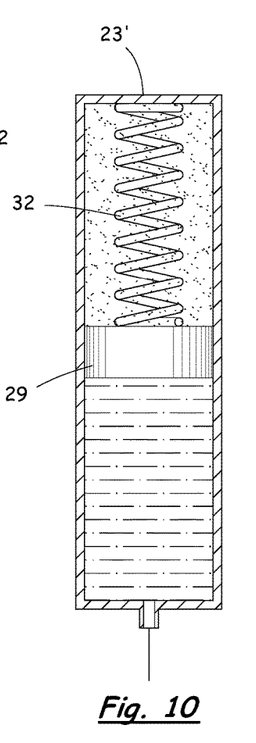
FIG. 10 is a cross section diagram of an external spring pack that uses a coil spring and a pressurized gas to apply a spring force to the hydraulic fluid in the vehicle suspension system.
Figure 11:
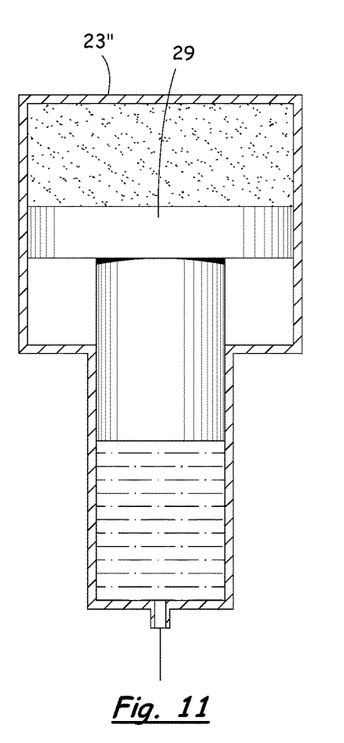
FIG. 11 is a cross section diagram of an external spring pack that uses a pressurized gas to apply a spring force to the hydraulic fluid in the vehicle suspension system.

FIGS. 9 to 11 illustrate various configurations and springs that can be used for the external spring packs 23, 24. Specifically, FIG. 9 shows a spring pack 23, 24 having a coil spring 32 used to apply a mechanical spring force to the piston plunger 29 in the spring pack 23, 24; FIG. 10 shows a spring pack 23' having a coil spring 32 and a pressurized gas used to apply a combined mechanical and compressed gas spring force to the piston plunger 29; and FIG. 11 shows a spring pack 23" having a compressed gas chamber used to apply a compressed gas spring force to the piston plunger 29. In each of these variations, a spring force is imparted to the piston plunger 29 in the spring pack 23, 23', 23", which in turn causes a hydraulic pressure to be applied to the fluid in the associated hydraulic cylinder assembly 11, 12.

The external spring packs 23, 24 maintain a substantially constant spring force on the suspension system 10 over a range of telescopic movement of the hydraulic cylinder assemblies 11, 12 to accommodate height changes of the vehicle V while maintaining a comfortable ride. The spring rate of the external spring packs 23, 24 will remain substantially constant during a full range of movement of the hydraulic cylinder assemblies 11, 12.

However, the effective spring rate will vary for each stage of extension of the hydraulic cylinder assemblies 11, 12. For example, when the hydraulic cylinder assemblies 11, 12 are contracted to their first stage (i.e., the intermediate cylinder 17 is extended less than its full length from the base cylinder 16), the effective cross section of the hydraulic cylinder assembly 11, 12 is relatively large based on the internal diameter of the base cylinder 16. This will cause a stiffer ride for the vehicle because each increment of movement of the hydraulic cylinder assembly 11, 12 will result in a relatively greater movement of the spring 32 in the external spring pack 23, 24.

When the hydraulic cylinder assemblies 11, 12 are extended to their second stage, the effective cross section of the hydraulic cylinder assembly 11, 12 is relatively smaller based on the internal diameter of the intermediate cylinder 17. This will cause a softer ride for the vehicle because each increment of movement of the hydraulic cylinder assembly 11, 12 will result in a relatively smaller movement of the spring 32 in the external spring pack 23, 24. Thus, the multi-stage aspect of the hydraulic cylinder assemblies 11, 12 provides an automatic change in the effective spring rate of the vehicle based on the adjusted height of the suspension (i.e., stiffer ride when the height is adjusted to a low setting, and softer ride when the height is adjusted to a high setting).

The vehicle suspension system 10 includes fluid damping valves 37, 38 that restrict hydraulic fluid flow between the hydraulic cylinder assemblies 11, 12 and the external spring packs 23, 24. The fluid damping valves 37, 38 function to dampen telescopic movement of the hydraulic cylinder assemblies 11,12 during operation of the vehicle over varying terrain and operating conditions. The fluid damping valves 37, 38 are inline systems that dampen fluid forces as hydraulic fluid passes in either direction between the hydraulic cylinder assemblies 11, 12 and the external spring packs 23, 24.

A controller 39 is provided to control a control valve assembly 40 for regulating flow of hydraulic fluid into and out of the suspension system 10. The control valve assembly 40 has a plurality of control valves with solenoids in a ported block. The control valves each have a pressure inlet port connected to a hydraulic pump that provides a pressure source 41 for the system 10, and a return port connected to a hydraulic reservoir 42. The hydraulic pump 41 can be, for example, a 12 volt hydraulic pump mounted inside of a frame rail of the vehicle. The pump 41 is connected by hydraulic lines to pull fluid from the reservoir 42 and to supply fluid pressure to the control valve assembly 40.

The control valves in the control valve assembly 40 each have a first position in which hydraulic fluid flows from the pressure inlet to a respective one of the hydraulic cylinder assemblies 11, 12, a second position in which hydraulic fluid flows through from a respective one of the hydraulic cylinder assemblies 11, 12 to the hydraulic reservoir 42, and a third position in which hydraulic fluid is blocked from flowing through the control valve. The control valves are moved between their positions to individually control a flow of hydraulic fluid from the pressure source 41 to each of the hydraulic cylinder assemblies 11, 12, and a flow of hydraulic fluid out of each of the hydraulic cylinder assemblies 11, 12 to the reservoir 42.

The volume of hydraulic fluid maintained in the hydraulic cylinder assemblies 11, 12 determines the extended length of the hydraulic cylinder assemblies 11, 12, and hence, the height of the vehicle body 13 relative to the vehicle wheels 14, 15. The control valve assembly 40 can provide independent controls for the hydraulic cylinder assemblies 11, 12 independent of each other, or in multiples.

Suspension position sensors 43 are arranged on the vehicle V to measure a position of the vehicle body 13 relative to a respective vehicle wheel 14, 15 to provide feedback for adjusting a height and levelness of the vehicle body 13. Outputs signals from the position sensors 43 are communicated to the controller 39 for use in the height and level control.

A user interface 44 is provided to allow a user to change a height of the vehicle body 13. The user interface 44 may include, for example, a cell phone app utilizing a WiFi module connected to the controller 39, a hardwired remote input device on the vehicle, or an integrated Bluetooth connection through an on-board vehicle interface/navigation panel. Through any of these input devices, the operator can move any corner of the vehicle up or down independently or collectively by changing a volume of hydraulic fluid in the hydraulic cylinder assemblies 11, 12.

The user can set multiple preset heights that the controller will maintain automatically through a key-on cycle or drive cycle. For example, the controller 39 can be programmed to cause the vehicle to go to an operator pre-chosen ride height setting upon establishing the operator's identity through a pre-programmed key setting. For a second example, the operator can select a low vehicle height setting to facilitate exiting the vehicle or driving in a low ceiling area, and the controller 39 will cause the control valve assembly 40 to adjust the height of the hydraulic cylinder assemblies 11, 12 accordingly. For a third example, when an operator hooks onto a heavy trailer changing the vehicle rake, the controller 39 can auto level the vehicle to account for the additional loads. The controller 39 can also adjust lean angles on cornering or side hills based on inputs from accelerometer type sensors contained in the controller 39 or elsewhere on the vehicle.

The vehicle suspension 50 according to the present invention can also be used to provide an anti-sway feature for the vehicle, thus eliminating a need for other anti-sway components on the vehicle, such as anti-sway bars and links. As illustrated in FIG. 12, the suspension system 50 includes a pair of telescoping multi-stage hydraulic cylinder assemblies 11', 12' mounted on right and left sides of the vehicle, respectively. The hydraulic cylinder assemblies 11', 12' are arranged to selectively lift the vehicle when extended and lower the vehicle when contracted. As in the embodiments described above, each of the hydraulic cylinder assemblies 11', 12' has a plurality of cylinders telescoped or nested within each other, and a length of each hydraulic cylinder assembly 11', 12' in a fully extended condition is more than double a length thereof in a fully contracted condition.

The hydraulic cylinder assemblies 11', 12' in this embodiment are two-way cylinder assemblies having a primary side 51, 53 and a secondary side 52, 54. The primary sides 51, 53 of the cylinder assemblies 11', 12' are connected by hydraulic lines 55, 56 to respective fluid damping valves 57, 58 and external spring packs 59, 60. As in the embodiments described above, the external spring packs 59, 60 function to maintain spring forces on the hydraulic cylinder assemblies 11', 12' over a range of telescopic movement of the hydraulic cylinder assemblies 11', 12', and the damping valves 57, 58 function to restrict fluid flow between the hydraulic cylinder assemblies 11', 12' and the spring packs 59, 60 to dampen the movement of the hydraulic cylinder assemblies 11', 12'.

An anti-sway system is provided by having a first anti-sway fluid line 61 connected between the primary side 51 of the first hydraulic cylinder assembly 11' and the secondary side 54 of the second hydraulic cylinder assembly 12', and a second anti-sway fluid line 62 connected between the primary side 53 of the second hydraulic cylinder assembly 12' and the secondary side 52 of the first hydraulic cylinder assembly 11'. First and second accumulators 63, 64 are connected to the first and second anti-sway fluid lines 61, 62 to prevent excessive pressure spikes in the system during operation.

The first and second accumulators 63, 64 can have adjustable pressure settings to provide a range of anti-sway control. The expansion capacities of the accumulators 63, 64 can be substantially smaller than the expansion capacities of the external spring packs 59, 60 because the sway-control system only requires a relatively small volume of hydraulic fluid for sway control compared to the larger volume of fluid that passes from the hydraulic cylinder assemblies 11', 12' into the external spring packs 59, 60 when the vehicle travels over uneven terrain, etc.

Figure 13:
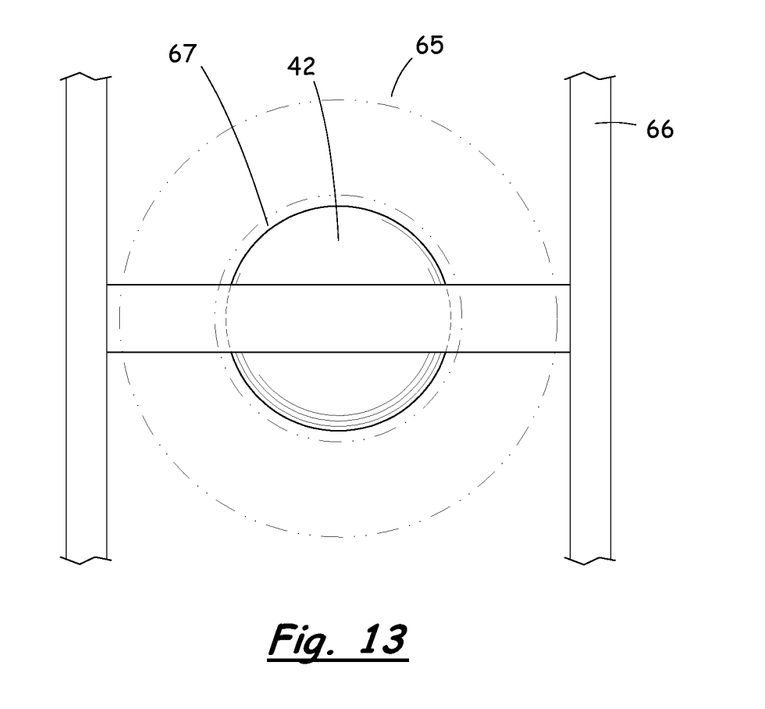
FIG. 13 is a plan view of a spare tire compartment under a pickup truck bed with a hydraulic reservoir of the vehicle suspension system of the present invention nested in a spare tire for the vehicle.

The hydraulic reservoir 42 for the vehicle suspension system 10, 50 can be located in the spare tire compartment of the vehicle. For example, in a pickup truck, the spare tire compartment 65 is located under the pickup truck bed 66. As illustrated in FIG. 13, the hydraulic reservoir 42 is arranged in the spare tire compartment 65 and arranged to be nested in the wheel cavity of the spare tire 67. In the case of a pickup truck, the hydraulic reservoir 42 is mounted in the spare tire compartment 65 under the pickup truck bed 66 with a hanging bracket for the spare tire 67 hanging down from a center of the hydraulic reservoir 42. The spare tire 67 can then be hung in the spare tire compartment 65 with the hydraulic reservoir 42 nested in the wheel cavity above the spare tire to optimize space.

While the invention has been specifically described in connection with specific embodiments thereof, it is to be understood that this is by way of illustration and not of limitation, and the scope of the appended claims should be construed as broadly as the prior art will permit.

What is claimed is:

1. A vehicle suspension system, comprising:
 a telescoping multi-stage hydraulic cylinder assembly arranged to selectively lift a vehicle body relative to a vehicle wheel when extended and lower the vehicle body relative to the vehicle wheel when contracted;
 an external spring pack in fluid connection with the hydraulic cylinder assembly to maintain a spring force on the suspension system over a range of telescopic movement of said hydraulic cylinder assembly; and
 a fluid damping valve for damping telescopic movement of the hydraulic cylinder assembly by restricting fluid flow between the hydraulic cylinder assembly and the spring pack;

wherein said hydraulic cylinder assembly comprises a plurality of telescoping cylinders nested within each other to provide at least two stages, said plurality of telescoping cylinders together define a single internal chamber in fluid connection with said external spring pack, and a length of said hydraulic cylinder assembly in a fully extended condition is more than double a length of said hydraulic cylinder assembly in a fully contracted condition.

2. The vehicle suspension system according to claim 1, wherein said spring pack is located remote from said hydraulic cylinder assembly.

3. The vehicle suspension system according to claim 1, wherein said spring pack comprises a cylindrical chamber in fluid connection with said hydraulic cylinder assembly, a piston arranged for sliding movement within said cylindrical chamber, and a spring arranged to bias said piston in a direction that applies hydraulic pressure to said hydraulic cylinder assembly.

4. The vehicle suspension system according to claim 3, wherein said spring comprises a coil spring arranged within said spring pack.

5. The vehicle suspension system according to claim 3, wherein said spring comprises a gas under pressure located within a chamber separated by said piston from said cylindrical chamber in fluid connection with said hydraulic cylinder assembly.

6. The vehicle suspension system according to claim 3, wherein said spring comprises a coil spring arranged within said spring pack and a gas under pressure within a chamber separated by said piston from said cylindrical chamber in fluid connection with said hydraulic cylinder assembly.

7. The vehicle suspension system according to claim 1, further comprising a suspension position sensor arranged to measure a position of the vehicle body relative to the vehicle wheel to provide feedback for adjusting a height of the vehicle body.

8. The vehicle suspension system according to claim 1, further comprising a control valve having a pressure inlet connected to a source of fluid pressure, a pressure return connected to a hydraulic reservoir, a port connected to said hydraulic cylinder assembly, and a controller for moving the valve between a first position in which hydraulic fluid flows from the pressure inlet to said hydraulic cylinder assembly, a second position in which hydraulic fluid flows through from said hydraulic cylinder assembly to said hydraulic reservoir, and a third position in which hydraulic fluid is blocked from flowing through said control valve.

9. The vehicle suspension system according to claim 1, wherein said fluid damping valve comprises an inline valve system that dampens fluid forces as hydraulic fluid passes in either direction between the hydraulic cylinder assembly and the spring pack.

10. The vehicle suspension system according to claim 1, wherein said external spring pack maintains a substantially constant spring force on the suspension system over a range of telescopic movement of said hydraulic cylinder assembly to accommodate height changes of the vehicle body relative to the vehicle wheel while maintaining a comfortable ride.

11. A vehicle comprising:
a vehicle body;
a plurality of wheels; and
a suspension system that connects the vehicle body to said plurality of wheels and allows relative motion between said vehicle body and said wheels, said suspension system comprising:

a plurality of telescoping multi-stage hydraulic cylinder assemblies arranged to selectively lift the vehicle body relative to the wheels when extended and to lower the vehicle body relative to the wheels when contracted;
a plurality of external spring packs in fluid connection with the plurality of hydraulic cylinder assemblies to maintain spring forces on the suspension system over a range of telescopic movement of said hydraulic cylinder assemblies; and
a plurality of fluid damping valves for damping telescopic movement of the hydraulic cylinder assemblies by restricting fluid flow between the hydraulic cylinder assemblies and the spring packs;
wherein each of said hydraulic cylinder assemblies comprises a plurality of telescoping cylinders nested within each other to provide at least two stages, wherein said plurality of cylinders together define a single internal chamber within each hydraulic cylinder assembly in fluid connection with a respective one of said external spring packs, and wherein a length of each of said hydraulic cylinder assemblies in a fully extended condition is more than double a length thereof in a fully contracted condition.

12. The vehicle according to claim 11, wherein said plurality of wheels comprises four wheels, said plurality of hydraulic cylinder assemblies comprises four hydraulic cylinder assemblies associated with said four wheels, respectively, said plurality of external spring packs comprises four external spring packs associated with said four hydraulic cylinder assemblies, respectively, and said plurality of fluid damping valves comprises four fluid damping valves associated with said four hydraulic cylinder assemblies and said four external spring packs, respectively.

13. The vehicle according to claim 11, wherein said spring packs are located remote from said hydraulic cylinder assemblies and each comprises a cylindrical chamber in fluid connection with a respective one of said hydraulic cylinder assemblies, a piston arranged for sliding movement within said cylindrical chamber, and a spring arranged to bias said piston in a direction that applies hydraulic pressure to the respective hydraulic cylinder assembly.

14. The vehicle according to claim 11, further comprising a plurality of suspension position sensors associated with said hydraulic cylinder assemblies, said suspension sensors each being arranged to measure positions of the vehicle body relative to a respective one of the wheels to provide feedback for adjusting a height and levelness of the vehicle body.

15. The vehicle according to claim 11, further comprising a control valve assembly for controlling hydraulic fluid flow into and out of said hydraulic cylinder assemblies, said control valve assembly having a pressure inlet connected to a source of fluid pressure, a pressure return connected to a hydraulic reservoir, and a plurality of valve members that individually control a flow of hydraulic fluid from said source of fluid pressure to each of said hydraulic cylinder assemblies, and a flow of hydraulic fluid from each of said hydraulic cylinder assemblies to said reservoir.

16. The vehicle according to claim 11, wherein said external spring packs maintain a substantially constant spring force on the suspension system over a range of telescopic movement of said hydraulic cylinder assemblies to accommodate height changes of the vehicle body relative to the wheels while maintaining a comfortable ride.

17. A vehicle comprising:
a vehicle body;
a plurality of wheels; and
a suspension system that connects the vehicle body to said plurality of wheels and allows relative motion between said vehicle body and said wheels, said suspension system comprising:
a plurality of telescoping multi-stage hydraulic cylinder assemblies arranged to selectively lift the vehicle body relative to the wheels when extended and to lower the vehicle body relative to the wheels when contracted,
a plurality of external spring packs in fluid connection with the plurality of hydraulic cylinder assemblies to maintain spring forces on the suspension system over a range of telescopic movement of said hydraulic cylinder assemblies, and
a plurality of fluid damping valves for damping telescopic movement of the hydraulic cylinder assemblies by restricting fluid flow between the hydraulic cylinder assemblies and the spring packs;
further comprising a hydraulic reservoir in fluid connection with said hydraulic cylinder assemblies, said hydraulic reservoir being located in a spare tire compartment of the vehicle and arranged to be nested in a spare tire for the vehicle.

18. A vehicle suspension comprising:
first and second telescoping multi-stage hydraulic cylinder assemblies mounted on right and left sides of a vehicle, respectively, said hydraulic cylinder assemblies being arranged to selectively lift the vehicle when extended and lower the vehicle when contracted, wherein each of said hydraulic cylinder assemblies comprises a plurality of telescoping cylinders nested within each other to provide at least two stages, wherein said plurality of telescoping cylinders together define a single internal chamber within each hydraulic cylinder assembly, wherein a length of each of said hydraulic cylinder assemblies in a fully extended condition is more than double a length thereof in a fully contracted condition, and wherein each of said hydraulic cylinder assemblies are two-way cylinder assemblies having a pressure side and a reservoir side;
first and second external spring packs in fluid connection with the internal chambers of said first and second hydraulic cylinder assemblies, respectively, to maintain spring forces on the hydraulic cylinder assemblies over a range of telescopic movement of said hydraulic cylinder assemblies;
fluid damping valves for damping movement of the hydraulic cylinder assemblies by restricting fluid flow between the hydraulic cylinder assemblies and the spring packs; and
an anti-sway system comprising a first anti-sway fluid line connected between a primary side of the first hydraulic cylinder assembly and a secondary side of the second hydraulic cylinder assembly, and a second anti-sway fluid line connected between a primary side of the second hydraulic cylinder assembly and a secondary side of the first hydraulic cylinder assembly.

* * * * *